United States Patent
Mothersdale et al.

(10) Patent No.: US 10,892,571 B2
(45) Date of Patent: *Jan. 12, 2021

(54) ARRANGEMENT FOR A COAXIAL CABLE CONNECTOR

(71) Applicant: Teleste Oyj, Littoinen (FI)

(72) Inventors: Keith Mothersdale, Settle (GB); Steve Gribby, Hayling Island (GB); Arno Albricht, Veenendaal (NL); Nicolas Winandy, Liège (BE); Robert Wilkins, Leyburn (GB)

(73) Assignee: TELESTE OYJ, Littoinen (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/781,900

(22) PCT Filed: Dec. 8, 2016

(86) PCT No.: PCT/FI2016/050856
§ 371 (c)(1),
(2) Date: Jun. 6, 2018

(87) PCT Pub. No.: WO2017/098084
PCT Pub. Date: Jun. 15, 2017

(65) Prior Publication Data
US 2018/0375229 A1    Dec. 27, 2018

(30) Foreign Application Priority Data
Dec. 9, 2015  (EP) .................................. 15397540

(51) Int. Cl.
*H01R 4/62*    (2006.01)
*H01R 9/05*    (2006.01)
(Continued)

(52) U.S. Cl.
CPC ............ *H01R 4/62* (2013.01); *H01R 9/0521* (2013.01); *H01R 9/0524* (2013.01); *H01B 13/26* (2013.01); *H02G 15/184* (2013.01)

(58) Field of Classification Search
CPC .... H01R 2103/00; H01R 24/40; H01R 24/50; H01R 13/658; H01R 9/0521;
(Continued)

(56) References Cited

U.S. PATENT DOCUMENTS 5,123,864 A     6/1992  Karlovich
7,118,416 B2 *  10/2006 Montena ............ H01R 13/5205
                                                    439/584
(Continued)

FOREIGN PATENT DOCUMENTS

CN        203277675 U    11/2013

OTHER PUBLICATIONS

The Patent Office of the People's Republic of China, Notification of the First Office Action in Chinese patent application No. 2016800723489, dated May 28, 2019, 1page original, 1page translated.

*Primary Examiner* — Gary F Paumen
(74) *Attorney, Agent, or Firm* — Berggren LLP (57) ABSTRACT

An arrangement for connecting a coaxial cable (500) to a connector, wherein the coaxial cable (500) comprises at least one metal braid layer (506) surrounding inner parts of the cable (500) and an outer insulating layer (508) surrounding said at least one metal braid layer (506); the connector comprises a ferrule (512) to be arranged in electrical contact with said at least one metal braid layer (506) and means (514, 516) for applying a pressure force (522) to the outer insulating layer (508) of the coaxial cable (500) in a position of said electrical contact; and a silicone sleeve (520) is arranged between said means (514, 516) for applying a pressure force (522) and the outer insulating layer (508) of the coaxial cable (500) in a position that, when said inner parts (502, 504) of the cable (500) are inserted within the ferrule (512), said pressure force (522) is applied to the silicone sleeve (508).

4 Claims, 4 Drawing Sheets (51) Int. Cl.
*H01B 13/26* (2006.01)
*H02G 15/184* (2006.01)

(58) Field of Classification Search
CPC ...... H01R 9/0518; H01R 9/0524; H01R 4/62; H01B 13/26; H02G 15/184
USPC .................................................. 439/578–585
See application file for complete search history.

(56) References Cited

U.S. PATENT DOCUMENTS

| | | | | |
|---|---|---|---|---|
| 7,210,276 B1* | 5/2007 | Kraft | .................... | E04F 15/022 |
| | | | | 156/74 |
| 7,513,795 B1* | 4/2009 | Shaw | .................... | H01R 9/0521 |
| | | | | 439/578 |
| 7,841,896 B2* | 11/2010 | Shaw | .................... | H01R 9/0521 |
| | | | | 439/578 |
| 8,371,874 B2* | 2/2013 | Shaw | .................... | H01R 9/0524 |
| | | | | 439/578 |
| 8,834,200 B2* | 9/2014 | Shaw | .................... | H01R 13/46 |
| | | | | 439/578 |
| 10,530,074 B2* | 1/2020 | Mothersdale | ........ | H01R 9/0524 |
| 2005/0181652 A1 | 8/2005 | Montena | | |
| 2009/0170360 A1 | 7/2009 | Shaw | | |
| 2009/0176407 A1* | 7/2009 | Shaw | .................... | H01R 9/0521 |
| | | | | 439/584 |
| 2011/0065317 A1* | 3/2011 | Shaw | .................... | H01R 9/0524 |
| | | | | 439/578 |
| 2013/0149884 A1* | 6/2013 | Shaw | .................... | H01R 13/46 |
| | | | | 439/275 |
| 2020/0127393 A1* | 4/2020 | Mothersdale | ........ | H01R 9/0524 |

* cited by examiner

ARRANGEMENT FOR A COAXIAL CABLE CONNECTOR

PRIORITY

This application is a U.S national application of the international application number PCT/FI2016/050856 filed on 8 Dec. 2016, which claims priority of European patent applications EP15397540.4 filed on Dec. 9, 2015, the contents of all of which are incorporated herein by reference.

FIELD OF THE INVENTION

The present invention relates to television network installations and more particularly to an arrangement for a coaxial cable connector.

BACKGROUND OF THE INVENTION

F type connectors, specified in the standard IEC 60169-24, have been used for decades for terrestrial, cable, and satellite TV installations. The F connector has become a popular coaxial cable connector due to its inexpensiveness, good impedance matching to 75$\Omega$, and wide bandwidth usability. The male F connector body is typically crimped or compressed onto the exposed outer braid of the coaxial cable. Female F Type connectors have an external thread to which male connectors having a matching internally threaded connecting ring are connected by screwing.

In various TV installations, it is vital that the metal-to-metal contact resistance between the connector and the cable braiding is optimised and maintained over time for good contact resistance. Any degradation in overall contact resistance will result in increasing the transfer impedance and will degrade the screening effectiveness.

In light of the new 4G LTE wireless services, which operate within the CATV frequency spectrum, it has become imperative that cable interconnect assemblies, i.e. the coaxial cable with a connector attached, meet a very high screening effectiveness as a market requirement based on a CENELEC standard.

However, practically none of the current coaxial cable assemblies can maintain Class A++ shielding efficiency over time. It has turned out that while a cable interconnect assembly may meet the Class A++ requirements when manufactured, the coupling transfer function of the same assembly has degraded significantly after having been installed in a CATV network some time.

Consequently, there is a need for an improved arrangement for connecting a coaxial cable to a connector.

SUMMARY OF THE INVENTION

Now an improved arrangement has been developed to alleviate the above-mentioned problems. As an aspect of the invention, there is provided an arrangement for connecting a coaxial cable to a connector, which is characterized in what will be presented in the independent claim. The dependent claims disclose advantageous embodiments of the invention.

According to a first aspect, there is provided an arrangement for connecting a coaxial cable to a connector, wherein the coaxial cable comprises at least one metal braid layer surrounding inner parts of the cable and an outer insulating layer surrounding said at least one metal braid layer; the connector comprises a ferrule to be arranged in electrical contact with said at least one metal braid layer and means for applying a pressure force to either the outer insulating layer or said at least one metal braid layer of the coaxial cable in a position of said electrical contact; and a silicone sleeve is arranged between said means for applying a pressure force and either the outer insulating layer or said at least one metal braid layer of the coaxial cable in a position that, when said inner parts of the cable are inserted within the ferrule, said pressure force is applied to the silicone sleeve.

According to an embodiment, the silicone sleeve is arranged around the outer insulating layer of the coaxial cable before connecting the coaxial cable to the connector.

According to an embodiment, the silicone sleeve is arranged within said connector in a position co-locating with said means for applying the pressure force before connecting the coaxial cable to the connector.

According to an embodiment, the silicone sleeve is made of silicone having Shore A hardness value of 20 to 80.

According to an embodiment, the silicone sleeve is arranged to compensate for a deformation of the outer insulating layer of the coaxial cable by expansion such that said pressure force at said electrical contact remains substantially constant.

According to an embodiment, said at least one metal braid layer of the coaxial cable is made of copper or tinned copper.

According to an embodiment, the connector is a F type male compression connector or a F type male crimp connector.

According to a second aspect, there is provided use of a silicone sleeve for compensating for a deformation of an outer insulating layer of a coaxial cable by expansion in an arrangement, wherein the coaxial cable is connected to a connector and the deformation is caused by a pressure force applied by said connector to the outer insulating layer of the coaxial cable.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 an example of the structure of a coaxial cable.

DESCRIPTION OF EMBODIMENTS

In the following, the problems relating to prior art are first described more in detail. Subsequently, the actual technical reasons underlying the problems, only revealed in the recent studies by the applicant, are elucidated.

Figure 1:
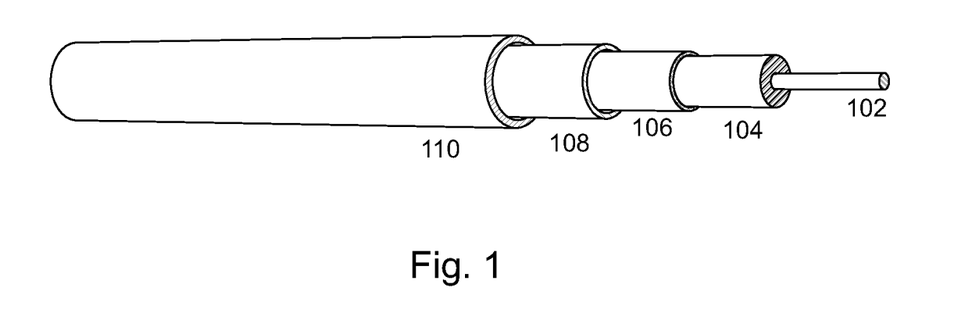

FIG. 1 shows an example of the structure of a coaxial cable. The cable 100 comprises an inner (or centre) conductor 102 for conducting electrical signals. The inner conductor 102 is typically made of copper or copper plated steel. The inner conductor 102 is surrounded by an insulating layer 104 forming a dielectric insulator around the conductor 102. The insulator surrounding the inner conductor may be solid plastic, such as polyethylene (PE) or Teflon (PTFE), a foam plastic, or air with spacers supporting the inner conductor.

The insulating layer 104 is surrounded by a thin metallic foil 106 typically made of aluminium. This is further surrounded by a woven metallic braid 108. FIG. 1 shows only one braid layer 108, but there may be two (inner and outer) layers of braid, or even more braid layers. Braiding is typically made of unalloyed aluminium, copper or tinned copper, depending on the intended field of use of the coaxial cable. For example, coaxial cables used in various TV assemblies typically have the braiding made of unalloyed aluminium. The cable is protected by an outer insulating jacket 110, typically made of polyvinylchloride (PVC).

The structure of the coaxial cable enables to minimize the leakage of electric and magnetic fields outside the braiding by confining the fields to the dielectric and to prevent outside electric and magnetic fields from causing interference to signals inside the cable. The shielding efficiency of each coaxial cable is characterized by its coupling transfer function, which may be defined as the transfer impedance and the screening attenuation measured together. The coupling transfer function is primarily dependent on the make-up of the coaxial cable, in part the outer and inner metal braiding and foil construction of the cable. However, for the practical use in various TV assemblies, the cable needs to be connected to the coaxial F connector.

There are two basic functional types of coaxial F type connectors currently available, i.e. crimp connectors and compression connectors. Both connector types include an outer body, a ferrule and a fixing nut. In order to make a ground connection between the cable braiding and connector, both of said connector types use a simple method of compressing the (outer) braid of the coaxial cable onto the connector ferrule. Both achieve the same outcome of connecting the coaxial cable to the connector by compression via the cable PVC outer jacket.

In order to achieve optimum transfer impedance, it is imperative that the metal-to-metal contact resistance between the connector and the cable braiding is optimised and maintained over time for good contact resistance. Any degradation in overall contact resistance will result in increasing the transfer impedance.

In light of the new 4G LTE wireless services, which operate within the CATV frequency spectrum, it has become imperative that cable interconnect assemblies, i.e. the coaxial cable with a connector attached, meet a very high screening effectiveness. For example, cable TV operators generally require the screening effectiveness to remain at −105 dB for the frequency range of 30-1000 MHz and the transfer impedance at 0.9 mΩ/m for 5-30 MHz, which are substantially in line with the CATV industry EN50117-2-4 Cenelec Standards as Class A++. Previous cable assemblies required only Class A+, i.e. −95 dB for 30-1000 MHz.

It has turned out that practically none of the current coaxial cable assemblies can maintain Class A++ shielding efficiency over time. The cable TV industry has identified the problem that while a cable interconnect assembly may meet the Class A++ requirements when manufactured, the coupling transfer function of the same assembly has degraded significantly after having been installed in a CATV network some time.

Figure 2A:
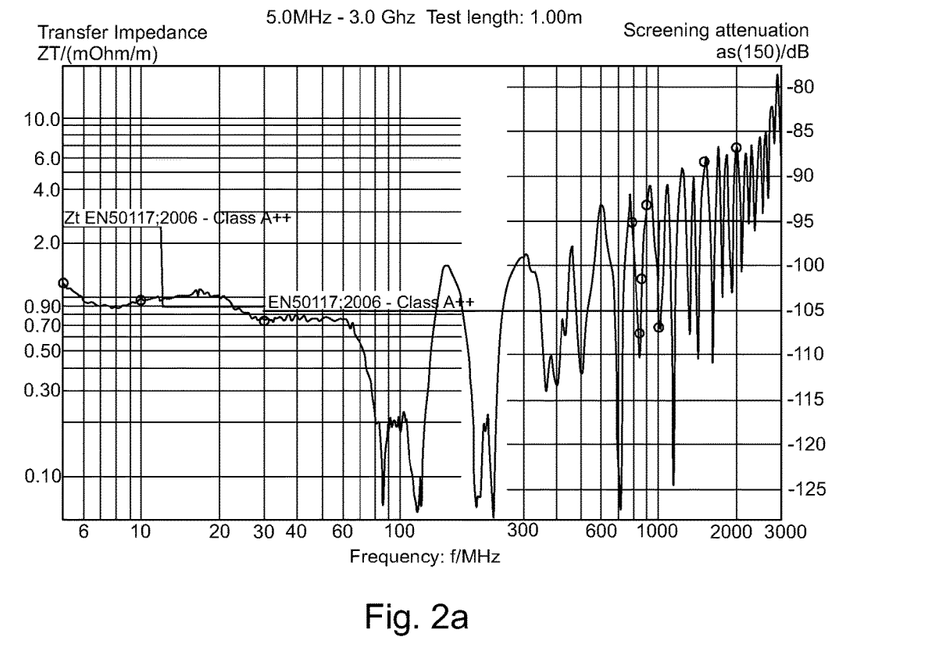
FIGS. 2a, 2b illustrate the effect of ageing to the coupling transfer function of a coaxial cable interconnect assembly.
Figure 2B:
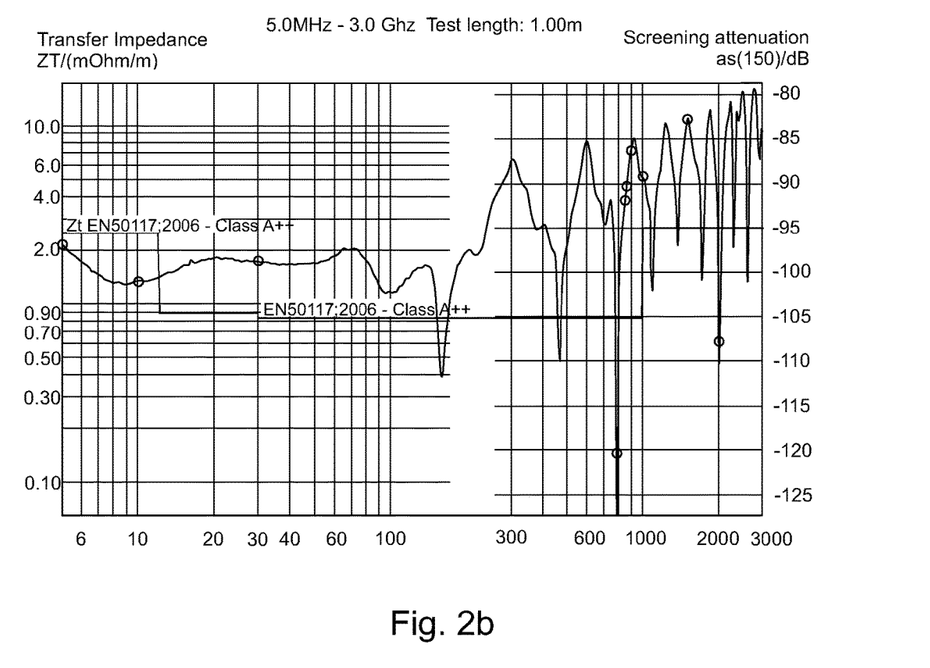

The phenomenon can be illustrated by the test results shown in FIGS. 2a and 2b. FIG. 2a shows the coupling transfer function of a non-used cable interconnect assembly. It can be seen that the coupling transfer function meets rather well the Class A++ requirements, especially on the low frequency 5-30 MHz transfer impedance requirements.

FIG. 2b shows the coupling transfer function of the same cable interconnect assembly after a temperate cycle test. The temperature cycle test simulates the basic ageing of the cable assembly by taking the cable to its minimum and maximum temperature limits. In this particular test, a one week temperature cycling was carried out from −20° C. to +60° C. with a dwell time of 5 minutes. As can be seen in FIG. 2b, the coupling transfer function has seriously degraded. Both the low frequency transfer impedance and overall screening effectiveness have degraded.

Now the research has proven that the issue relates to a degradation of the metal-to-metal contact resistance between the coaxial cable braiding and the connector ferrule. This contact resistance degrades over time, and is a result of the PVC cable outer jacket being used to apply the required pressure when the connector is compressed.

After detailed research, it has turned out that the problem is caused by two phenomena. The first relates to the cable braiding, which in CATV coaxial cables is mainly unalloyed aluminium. The second relates to the PVC jacket of the cable. Both these materials exhibit an issue called "creep". Material creep (a.k.a. cold flow) is defined as a solid material moving slowly or deformed permanently under the influence of mechanical stresses. It occurs as a result of long-term exposure to high levels of stress that are still below the yield strength of the actual material.

In the case of unalloyed aluminium, creep may exist under the slightest force and the contact force will gradually decrease over time. PVC polymers exhibit the same issue and are very unstable in joint applications. In current coaxial cable/connector scenarios, the cable jacket and braid polymers are in series with the main joint compression. Polymers have large temperature and moisture expansion rates and will creep over time until joint contact is eventually reduced to almost zero.

There are three key stages to creep, i.e. primary, secondary and tertiary creep. In the initial stage, i.e. primary creep, the strain rate is relatively high, but slows with increasing time. This is due to work hardening. The strain rate eventually reaches a minimum and becomes near constant. This is due to the balance between work hardening and annealing (i.e. thermal softening). The substantially constantly growing stage is known as secondary or steady creep. The characterised "creep strain rate" typically refers to the rate in this secondary stage. Stress dependence of this rate depends on the creep mechanism. Finally with tertiary creep, the strain rate exponentially increases with stress because of necking phenomena. Fracture always occurs at the tertiary stage.

In the case of the degradation in the metal-to-metal contact resistance of the cable/connector, it is the primary stage and the secondary stage of creep that are most applicable, although the tertiary creep may apply over a long time period and exposure to temperature extremes, which can be the case in some CATV applications.

In addition to creep phenomenon, a further problem was identified during the above research. This problem relates to the metal-to-metal galvanic reaction between the CATV F connector plating material and that of the coaxial cable aluminium braid. This is even more serious problem than creep, and it specifically affects the low frequency transfer impedance of the coaxial cable, as well as to some extent the screening effectiveness.

Any galvanic reaction between the connector and coaxial cable grounding contact points will eventually lead to one of the most serious problems in any broadband cable network, namely the generation of Common Path Distortion (CPD). CPD is a collective term, which includes all beat products which are generated within a broadband cable system, that fall within the upstream return path frequency spectrum. The beat energy generated that falls within the upstream spectrum results when the forward path signals pass over a connection point. This excludes any beat energy generated by active components. CPD is caused by a connection point that exhibits a nonlinear transfer characteristic as shown above. CPD is one of the most difficult and problematic issues within any broadband cable system, since any faults of the system generally exhibit as intermittent issues, and as a result, are very difficult to identify. For this reason, CPD can sometimes be misinterpreted as upstream ingress noise.

Major in-depth research over many years has shown that the F connector metal-to-metal contact between the actual device it connects to and the cable mating parts is a key issue regarding CPD. Research has shown that NiSn (nickel tin) against NiSn plating produces the best option for metal-to-metal contact with minimum effect on CPD. As a result, most connectors are plated with either NiSn or nickel. Nickel does not perform as well, as it is harder plating than NiSn, but nevertheless is still deployed in large volumes.

Consequently, the NiSn or nickel plating of the coaxial F connector is connected to the coaxial cable braid of unalloyed aluminium. However, aluminium is one of the worst possible materials when it comes to avoiding any form of galvanic corrosion effect with other metals. It is generally known that NiSn and nickel are a major problem when in contact with aluminium producing a galvanic voltage differential of 290 and 660 mV, respectively.

Moreover, the fact that the contact force reduces due to creep means that aluminium will start to further oxidise as it becomes exposed to air and possible moisture. Aluminium oxidisation is in two parts, and has two key issues with pressure type contacts. The first relates to poor surface conductivity due to insulating A1203 layer (known as sapphire) forming and constantly growing on the surface area, when the aluminium is exposed to air. The A1203 layer is a diamond-like layer and it is an excellent insulator. Any presence of water/moisture would also form an additional insulating material of aluminium hydroxide in the joint.

Figure 3A:
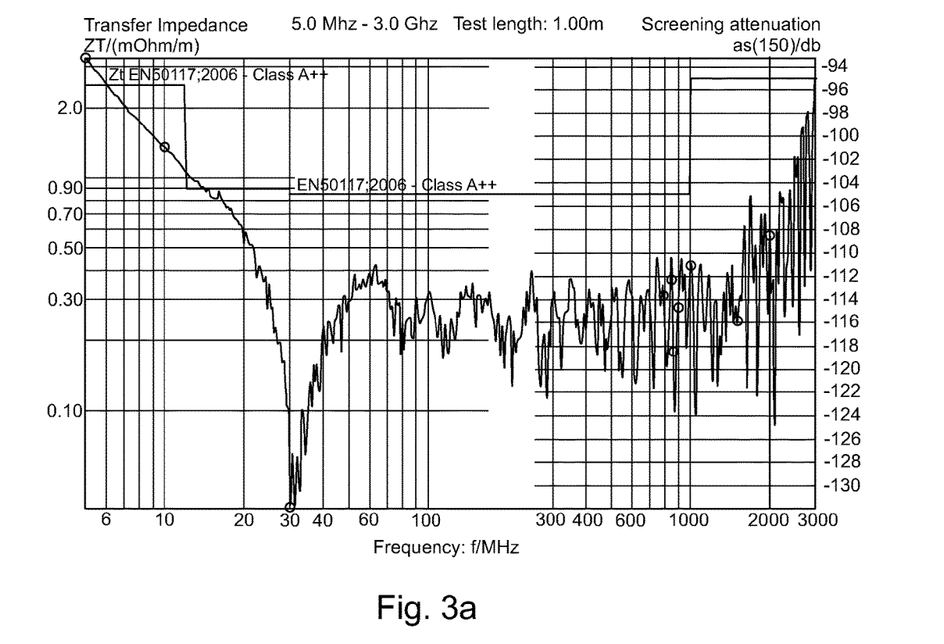
FIGS. 3a, 3b illustrate the effect of galvanic reaction to the coupling transfer function of a coaxial cable interconnect assembly having a NiSn plated F connector and aluminium cable braiding.
Figure 3B:
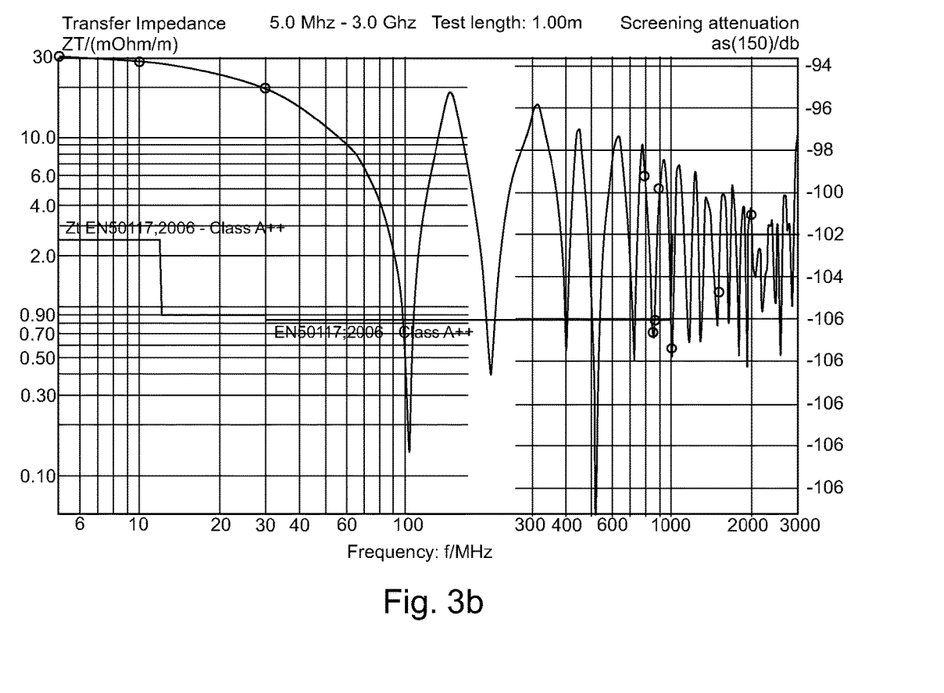

The galvanic reaction between a NiSn plated F connector and aluminium cable braiding can be illustrated by the test results shown in FIGS. 3a and 3b. FIG. 3a shows the coupling transfer function of a non-used cable interconnect assembly with a NiSn plated F connector and aluminium cable braiding. It can be seen that the coupling transfer function meets the Class A++ requirements practically throughout the required frequency range.

FIG. 3b shows the coupling transfer function of the same cable interconnect assembly after the same temperate cycle test as above in connection with FIG. 2b, but with the cable assembly then left in open air for 4 weeks. As can be seen in FIG. 3b, both the low frequency transfer impedance and overall screening effectiveness are very far from meeting the Class A++ requirements. The low frequency transfer impedance from 5 MHz to the cut-off frequency is in effect showing the degradation in the contact resistance between the cable braid and the connector body. The transfer impedance is shown in mΩ/metre and is a clear indication of potential CPD problem. The transfer impedance shows a serious increase in the metal-to-metal contact resistance between the cable braiding and the connector. This is clearly caused by galvanic reaction, which was further proven by cutting off the connectors and fitting the cable with fresh connectors whereby the cable reverted back to its original performance before temperature cycling.

Figure 4:
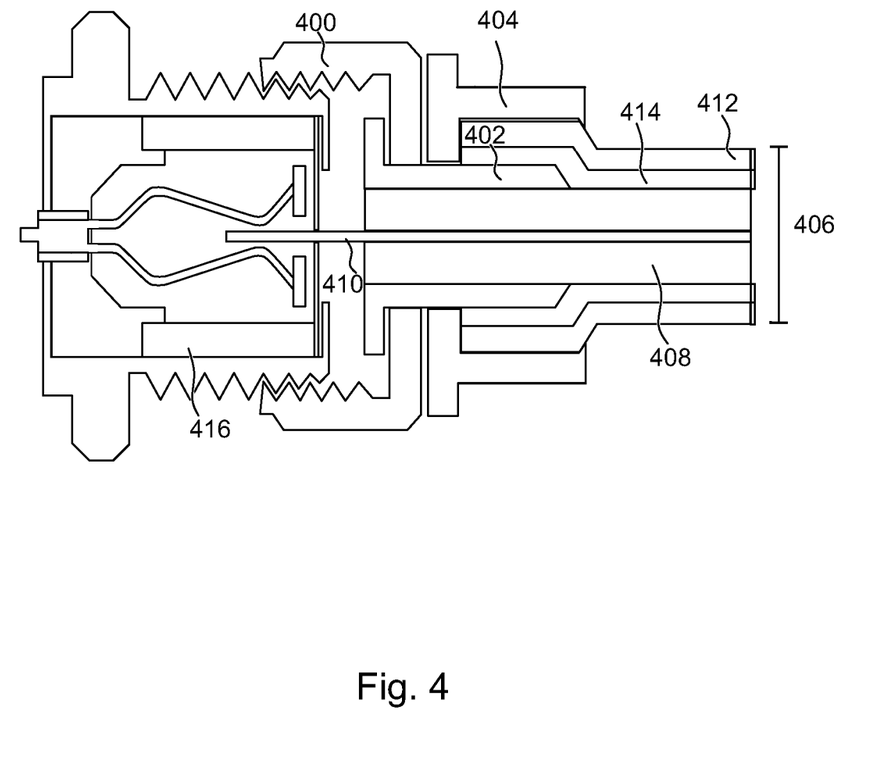
FIG. 4 shows a schematic cross-sectional view of a prior art F male compression connector with a coaxial cable connected to a F female connector.

FIG. 4 shows a schematic cross-sectional view of a prior art F male compression connector with a coaxial cable connected to an F female connector. The dimensions of various parts in FIG. 4 are not in scale. It is noted that the structure of the F female connector is not relevant for illustrating the underlying problems. The F male compression connector comprises the fixing nut 400, the ferrule 402 and the body 404. The F male compression connector is connected to the coaxial cable 406 such that the stripped dielectric insulator 408 and the inner conductor 410 of the coaxial cable are inserted in the ferrule 402 and the PVC jacket 412 of the cable is tightly compressed. The aluminium braiding 414 of the coaxial cable is in contact with the outer surface of the ferrule, thus providing ground connection. The body 404 of F male compression connector is connected to the F female connector 416 by screwing the fixing nut 400 to a corresponding thread in the body of the F female connector 416.

The problems arise from the fact that the ferrule 402 is typically NiSn plated and the braiding 414 of the coaxial cable is aluminium. The metal-to-metal contact points between the coaxial cable aluminium braid 414 and the NiSn plated connector ferrule 402 are the points at which said two parts mate to form the overall grounding point, but also the points which are subjected to galvanic corrosion due to above-described phenomena. Since the coaxial cable aluminium braid 414 and the NiSn plated connector ferrule 402 are not making an intimate metal-to-metal contact, an oxidising layer is developed, in this case due to dissimilar metals, as well as lack of contact pressure. The energy herein generates what is called the diode effect that in effect causes the nonlinear energy transfer (i.e. CPD) to occur.

Figure 5:
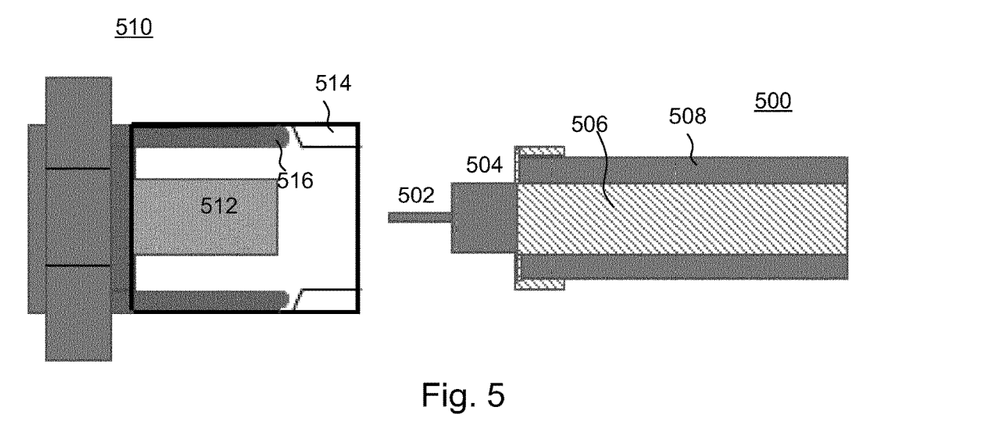
FIG. 5 illustrates a mechanism for connecting the F male compression connector to the coaxial cable.

The mechanism for connecting the F male compression connector to the coaxial cable is further illustrated in FIG. 5. The coaxial cable 500 is shown on the right side before the cable insertion. The coaxial cable 500 comprises the centre conductor 502 and the dielectric insulator 504. The coaxial cable 500 further comprises the braiding 506 and the PVC jacket 508, which have been stripped away around the dielectric insulator 504 for the installation. A stand-alone F male compression connector 510 is shown on the left side as before the cable insertion. The connector comprises the ferrule 512, the outer body 514 of the fixing nut, and the inner body 516 of the fixing nut. The inner body 516 is typically made of plastic. The side of the outer body 514 facing the inner body is slanted such that when pushed against the inner body 516 upon the insertion of the coaxial cable 500, the inner body bends inside and compresses the PVC jacket 508 of the coaxial cable.

The mechanism is typical for most F type compression connectors. When coaxial cable 500 has been properly inserted in the connector 510, the bended inner body 516 applies pressure between the cable braid 506 and the connector ferrule 512, which is the key metal-to-metal electrical contact between the cable and connector that will maintain optimum RFI shielding and transfer impedance. Whilst the connector compression is carried out, primarily to secure the cable and to prevent it from pulling out of the connector, the process adds some pressure force between the ferrule 512 and the braid 506.

However, as described above, the pressure between the cable braid 506 and the connector ferrule 512 will degrade over time due to the inherent material creep of the PVC jacket 508. As the PVC jacket creeps, it becomes thinner and thinner at the pressure point, and consequently the pressure will slowly degrade to a point whereby there is practically no pressure. In addition to F type compression connectors, the problem applies to F type crimp connectors currently on market.

Considering the popularity of F type connectors, there is a need for an improved arrangement for preventing the creep so as to ensure the steadiness of an optimal metal-to-metal electrical contact between the cable braid and the connector ferrule.

Now there has been invented a new arrangement for preventing the creep, which is applicable to both F type compression connectors and F type crimp connectors currently on market.

As the first aspect, there is provided an arrangement for connecting a coaxial cable to a connector, wherein the coaxial cable comprises at least one metal braid layer surrounding inner parts of the cable and an outer insulating layer surrounding said at least one metal braid layer; the connector comprises a ferrule to be arranged in electrical contact with said at least one metal braid layer and means for applying a pressure force either to the outer insulating layer or said at least one metal braid layer of the coaxial cable in a position of said electrical contact; and a silicone sleeve is arranged between said means for applying a pressure force and either the outer insulating layer or said at least one metal braid layer of the coaxial cable in a position that, when said inner parts of the cable are inserted within the ferrule, said pressure force is applied to the silicone sleeve.

Thus, the degradation of the RFI shielding is prevented by maintaining metal-to-metal contact resistance force with an additional silicone sleeve and thereby preventing the PVC cable jacket and aluminium cable creep, which would otherwise reduce the contact force over time. As a result, the eventual total signal failure and major RF screening leakage is prevented.

According to an embodiment, the silicone sleeve is arranged to compensate for a deformation of the outer insulating layer of the coaxial cable by expansion such that said pressure force at said electrical contact remains substantially constant.

As described above, over time the PVC cable jacket will creep and become thinner at the pressure point. The silicone sleeve will then expand and compensate the creep gap, thus maintaining a constant pressure at the pressure point. This will ensure optimum metal-to-metal contact force, and thus optimum contact resistance between the connector ferrule and cable braiding.

Figure 6:
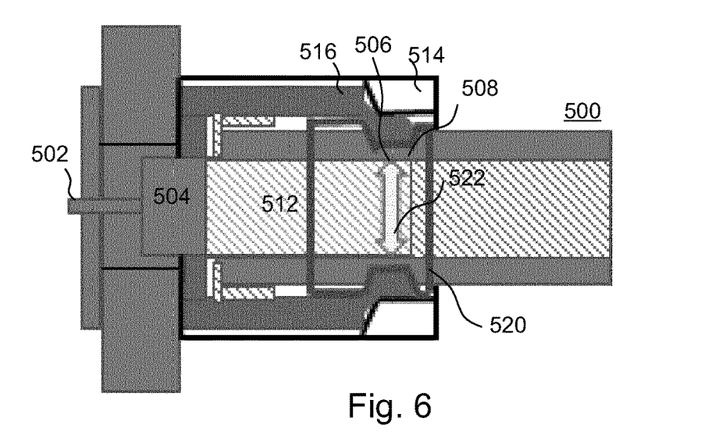
FIG. 6 shows the F male compression connector and the coaxial cable as shown in FIG. 5 as connected according to an embodiment of the invention.

Various embodiments of the arrangement are depicted in FIG. 6, which shows the F male compression connector and the coaxial cable as shown in FIG. 5 as connected according to the arrangement. In FIG. 6, the centre conductor 502 and the dielectric insulator 504 of the coaxial cable have been inserted in a cavity of the ferrule 512 such that the centre conductor 502 extends to the other side of connector so as to be connected to a female connector. Upon the insertion of the coaxial cable 500, the braiding 506 and the PVC jacket 508 have been guided to the outer surface of the ferrule 512 such that the cable braid 506 forms a metal-to-metal electrical contact (not shown) with the connector ferrule 512.

Moreover, upon the insertion of the coaxial cable 500, the slanted surface of the outer body 514 of the fixing nut has pushed the inner body 516 of the fixing nut such that the inner body has been bent inside and now compresses the PVC jacket 508 of the coaxial cable.

Now, between the inner body 516 and the PVC jacket 508, there is a silicone sleeve 520 positioned such that the pressure force applied by the outer and the inner body of the fixing nut is applied to primarily the silicone sleeve, and only as secondary to the PVC jacket of the cable via the silicone sleeve. The pressure point is indicated by an arrow 522. When the PVC cable jacket creeps and becomes thinner at the pressure point, the silicone sleeve compensates for the deformation by expanding against the PVC jacket such that the pressure force at the electrical contact remains substantially constant.

According to an embodiment, before the insertion of the coaxial cable, the PVC jacket 508 of the coaxial cable is stripped away at least for such length that, when inserted, the inner body 516 applies a force primarily the silicone sleeve, and only as secondary to the metal braid layer 506 of the cable via the silicone sleeve. Due to the evenly distributed force of the compression fitting, the metal braid layer is not damaged and no aluminium braiding oxidising occurs.

It is noted that the idea underlying the embodiments is not limited to F type connectors only. Therefore, while the means for applying a pressure force to the outer insulating layer of the coaxial cable in a position of said electrical contact in this example refer to the pressure force applied by the outer and the inner body of the fixing nut, said means may be implemented in various ways, depending on the structure of the connector in question.

Figure 7:
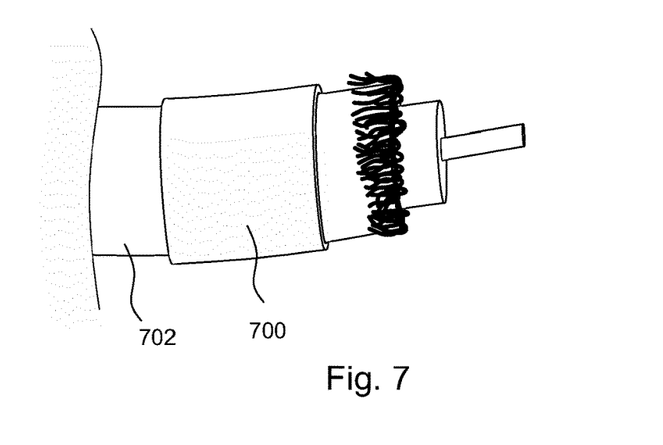
FIG. 7 shows an example of a silicone sleeve installed around the coaxial cable according to an embodiment of the invention.

According to an embodiment, the silicone sleeve is arranged around the outer insulating layer of the coaxial cable before connecting the coaxial cable to the connector. In many cases, it may be easier to connect the coaxial cable to the connector such that the silicone sleeve is pre-installed around the coaxial cable and coaxial cable is only then inserted in the connector. FIG. 7 shows an example, where the silicone sleeve 700 has been installed around the coaxial cable 702.

According to an embodiment, the silicone sleeve is arranged within said connector in a position co-locating with said means for applying the pressure force before connecting the coaxial cable to the connector. Thus, instead of pre-installing the silicone sleeve around the coaxial cable, the connector may include the silicone sleeve, and thus stand-alone connectors with the advantageous effects may be provided to the consumers.

According to an embodiment, the silicone sleeve is made of silicone having Shore A hardness value of 20 to 80. The hardness of materials may be measured according to Shore scales. There are at least 12 different Shore scales, and the hardness of various elastic materials, such as polymers, elastomers, and rubbers, are typically measured in Shore scales OO, A and D. Herein, the material hardness needs to be considered carefully, as it needs to be able to maintain a high pressure force on to the cable PVC jacket at the pressure point. Silicone, being a rubber-like polymer, can be manufactured at various hardness levels. The experiments have shown that best results are achieved by a soft to medium hard silicone having Shore A scale hardness value of about 20-80.

According to an embodiment, said at least one metal braid layer of the coaxial cable is made of copper or tinned copper. While the aluminium braiding is widely used in the coaxial cables of the existing CATV networks, the arrangement may be used for the construction of stand-alone Class A++ RF coaxial fly leads, i.e. interconnecting cables e.g. from a TV antenna wall socket to a television set or a set-top-box. Since the fly leads use either copper or tinned copper braided cables instead of an unalloyed aluminium braid cable, the galvanic corrosion issues can be avoided and Class A++ requirements can be more easily achieved.

A skilled person appreciates that any of the embodiments described above may be implemented as a combination with one or more of the other embodiments, unless there is explicitly or implicitly stated that certain embodiments are only alternatives to each other.

It is obvious that the present invention is not limited solely to the above-presented embodiments, but it can be modified within the scope of the appended claims.

The invention claimed is:

1. An assembly comprising a connector, a coaxial cable and a silicone sleeve configured around the coaxial cable,
wherein the coaxial cable comprises at least one metal braid layer surrounding inner parts of the cable and an outer insulating layer surrounding said at least one metal braid layer being stripped away for the length of electrical contact with said connector;
the connector comprises a ferrule configured to be in electrical contact with said at least one metal braid layer upon guiding said at least one metal braid layer to an outer surface of the ferrule, and means for applying a pressure force to said at least one metal braid layer of the coaxial cable in a position of said electrical contact; and wherein, upon inserting the coaxial cable into the connector, a silicone sleeve is configured to be between said means for applying a pressure force and said at least one metal braid layer of the coaxial cable in a position that said pressure force is applied to the silicone sleeve and further to said at least one metal braid layer of the coaxial cable, wherein the silicone sleeve surrounds the coaxial cable including said at least one metal braid layer such that the silicone sleeve is applying pressure directly to said at least one metal braid layer of the coaxial cable, wherein a slanted surface of an outer body of a fixing nut is configured to push an inner body of the fixing nut such that the inner body is bent inside and compresses the coaxial cable.

2. The assembly according to claim 1, wherein the silicone sleeve is made of silicone having Shore A hardness value of 20 to 80.

3. The assembly according to claim 1, wherein said at least one metal braid layer of the coaxial cable is made of copper or tinned copper.

4. The assembly according to claim 1, wherein the connector is a F type male compression connector or a F type male crimp connector.

* * * * *